United States Patent [19]

Kleeberg et al.

[11] 4,283,505
[45] Aug. 11, 1981

[54] METHOD FOR CROSS-LINKING AND STABILIZING POLYMERS WHICH CAN BE CROSS-LINKED RADICALLY

[75] Inventors: Wolfgang Kleeberg; Wolfgang Rogler; Wolfgang V. Gentzkow, all of Erlangen; Roland Rubner, Röttenbach, all of Fed. Rep. of Germany

[73] Assignee: Siemens Aktiengesellschaft, Berlin and Munich, Fed. Rep. of Germany

[21] Appl. No.: 40,469

[22] Filed: May 18, 1979

[30] Foreign Application Priority Data

May 31, 1978 [DE] Fed. Rep. of Germany ....... 2823820

[51] Int. Cl.$^3$ .................. C08F 287/00; C08F 265/04; C08F 255/02; C08F 255/06
[52] U.S. Cl. .................... 525/281; 556/410; 556/427; 556/441; 556/444; 556/486; 204/159.13; 260/45.7 R; 260/45.7 S; 260/45.9 QB; 260/45.8 NZ; 260/45.8 NW; 260/45.85 E; 260/45.85 V; 525/263; 525/279; 525/288; 544/69; 546/14
[58] Field of Search .............. 525/288, 263, 279, 281; 204/159.13; 260/45.7 R, 45.7 S, 45.95 C, 45.9 QB, 45.8 NZ, 45.85 E, 45.85 V

[56] References Cited

U.S. PATENT DOCUMENTS

| | | | |
|---|---|---|---|
| 3,345,326 | 10/1967 | Chang et al. | 260/45.7 R |
| 3,361,672 | 1/1968 | Andress et al. | 260/45.8 R |
| 3,485,660 | 12/1969 | Engelhardt | 525/288 |
| 3,510,507 | 5/1970 | Bown et al. | 260/45.95 C |
| 3,817,916 | 6/1974 | Parks | 260/45.85 E |
| 3,984,372 | 10/1976 | Cottman | 260/45.85 E |
| 4,058,583 | 11/1977 | Glander et al. | 204/159.13 |
| 4,117,195 | 9/1978 | Swanbrick | 525/288 |

FOREIGN PATENT DOCUMENTS 2745546  4/1978  Fed. Rep. of Germany.

OTHER PUBLICATIONS

J. Applied Polymer Science 19 2667–2682 (1975).
J. Applied Polymer Science 18 635–649 (1974).
J. Applied Polymer Science 17 3323–3335 (1973).

*Primary Examiner*—V. P. Hoke
*Attorney, Agent, or Firm*—Kenyon & Kenyon

[57] ABSTRACT

The invention relates to a method for cross-linking radically cross-linkable polymers and for stabilizing such polymers against oxidative and/or thermal decomposition. The method is developed so that rapid and economical cross-linking of radically cross-linkable polymers is obtained in the presence of oxidation inhibitors without adverse effects on the cross-linking process due to the oxidation inhibitor. For this purpose, the invention provides that the cross-linking is carried out in the presence of oxidation inhibitors, wherein the inhibition-active —OH and/or —NH functions are at least partially substituted by protective silyl- and/or silylene groups, the inhibitor molecule containing at least one Si-alkenyl group. The method according to the invention is suitable for use with radical as well as radiation-cross-linkable polymer.

5 Claims, No Drawings

METHOD FOR CROSS-LINKING AND STABILIZING POLYMERS WHICH CAN BE CROSS-LINKED RADICALLY

BACKGROUND OF THE INVENTION

The invention relates to a method for cross-linking polymers via a free radical process and for stabilizing such polymers against oxidative and/or thermal decomposition.

Polymers which can be cross-linked via a free radical process such as polyolefins, mixtures with a polyolefin base or with polyolefin as a substantial component, co-polymerizates of ethylene with α-olefins and ethylene derivative such as vinyl acetate, acrylic esters and styrene, find ever increasing application in many fields of engineering because of their excellent electrical and methanical properties. Of increasing importance is the use of cross-linked polyolefins as insulating material for cables and wires, since such cables and wires can withstand in continuous operation a maximum conductor temperature of 90° C. and during an overload a maximum temperature of 130° C. as a result of the improved thermomechanical properties of the cross-linked polyolefins.

For the radically cross-linked polymers to be suitable for use over a long period of time, a prerequisite is good chemical stability under the conditions of use. However, the above-mentioned polymers, especially if they are cross-linked are subject to accelerated oxidative and thermal decomposition at elevated temperatures. The degradation of their properties substantially shortened the useful life of the polymers. In order to maintain the required characteristics over a substantially longer period of time, such materials must be stabilized against thermo-oxidative decomposition. This is generally accomplished by the use of oxidation inhibitors. Oxidation inhibitors are phenolic or aminic organic compounds which act as radical trapping agents and can therefore interrupt or even prevent the radical decomposition mechanism in the oxidation of organic materials Information on the most important chemical and structural features of oxidation inhibitors and their operation can be found, for example, in W. L. Hawkins, *Polymer Stabilization,* Wiley-Interscience, John Wiley & Sons, Inc., New York, London, 1972 and G. K. Cowell, "Additives for Plastic-Antioxidants", Plastic Engineering, pages 51 to 57, (1976).

On the basis of the extensively known material on oxidation inhibitors and the multitude of such products, oxidation inhibitors can be characterized by the following features:

1. They contain at least one phenolic, if possible, sterically hindered hydroxyl group and/or at least one secondary aromatic amino group with a hydrogen which will be easily split off to form a radical, or they are heterocyclic compounds with NH groups. These compounds by transferring at least one hydrogen atom react with the radicals formed in oxidative aging.

2. Due to their chemical structure they are capable of developing low-energy radicals after losing hydrogen or to change into stable, non-radical compounds through secondary reactions.

The effectiveness of the oxidation inhibitors can be influenced by the lattice structure of the aromatic and heterocyclic base or by substituent groups. Further, it is substantially influenced by the solubility and the degree of homogeneity of the oxidation inhibitor in the polymer material.

Oxidation inhibitors are used, if only for cost reasons, only in small concentrations (about 0.01% to 5% by weight). The solubility of the oxidation inhibitors which are strongly polar in polymers which can be radically cross-linked, especially in partially crystalline polyolefins such a polyethylene and polypropylene, is so small, however, that the concentration and molecular-dispersive distribution required for optimum effectiveness cannot be obtained. Because of their low solubility, oxidation inhibitors tend to migrate to the surface of the polymer, from where they would evaporate more or less easily, depending on their vapor pressure. Thus, the polymer is very quickly depleted of these stabilizers, especially at elevated temperatures. As a result, rapid oxidative aging occurs due to the premature loss of the oxidation inhibitors, even if chemical highly effective oxidation inhibitors are used.

To avoid the loss of stability connected therewith, more and more attempts are being made to improve the solubility of the oxidation inhibitors. This is accomplished, for example, via substitution with long-chain alkyl radicals, addition of high-boiling liquid organosilicon compounds as dissolution agents or substitution by silyl radicals (R. V. Albarino and H. Schonhorn, J.Appl.Polym.Sci., 17 3323 (1973); 18, 635 (1974); 19 2667 (1975)). The substitution by silyl radicals is accomplished herein, for example, through reaction of suitable organosilicon compounds with the inhibitors via additional hydroxyl groups which do not participate in the oxidation-inhibiting effect. The hydrogen of these —OH groups is substituted with silyl groups. The —OH groups which function as oxidation inhibitors do not participate in these reactions. Rather, their reaction is expressly avoided, since it is assumed that the oxidation inhibitors may lose their effectiveness thereby.

The process of cross-linking radically cross-linkable polymers is closely related to the process of stabilizing the cross-linked polymers. It is technically advantageous and customary to add stabilizers, including oxidation inhibitors, to the polymers prior to processing them into the formed product with the cross-linking to be carried out thereafter. The cross-linking is therefore carried out in the presence of oxidation inhibitors. The oxidation inhibitors however react in the above-mentioned manner typically with the radicals active in cross-linking, so that cross-linking in the polymer is reduced and at the same time a large part of the oxidation inhibitor is deactivated.

In addition, effective long-term stabilization of the cross-linked polymers is made more difficult by the fact that they are more oxidation-sensitive than non cross-linked polymers. Specifically, long-life radicals remain from the cross-linking reaction which function as initiating radicals for thermo-oxidative aging, and an increased concentration of readily oxidizable groups. In addition, usage of the cross-linked polymers at elevated temperature results in a exponential acceleration of the decomposition reactions. Thus the oxidation inhibitors must meet more stringent requirements though their effectiveness is reduced by the cross-linking reaction.

To sufficiently stabilize the cross-linked polymers, especially polyolefins, relatively high concentrations of oxidation inhibitor are therefore required. High concentrations of oxidation inhibitor, however, cause a heavy reduction of cross-linking in the polymer, so that the concentration of the cross-linking initiator, such as, peroxide concentration or, the radiation dose where cross-linking is by radiation, also must be increased. It is extremely important that the concentrations of these components which reduce each other's effect, during the cross-linking reaction, be accurately matched to each other and to other components. This, however, makes the preparation of the mixture more complicated and expensive.

In spite of the complicated composition of the mixture and the additional use of cross-linkage accelerators, it is not always possible, for example, technically, in radiation-initiated cross-linking of cable and wire insulation with a polyolefin base, to obtain sufficient cross-linking for technical use at production rates necessary for economical manufacture, without either damaging the polymer material or to adversely affect its function as an insulator. The radiation doses required for cross-linking must be supplied in short intervals because heat and hydrogen are liberated during the irradiation. The heat cannot be removed at a sufficient speed when the insultation is of a certain thickness. Therefore, bubbles develop. To ensure production without problems, a way must be found to operate with lower radiation doses. This, in turn, assumes that a method can be found which makes it possible to reduce the interaction between the oxidation inhibitors and the reactive radicals during the cross-linking reaction and, in addition, to accelerate the cross-linking process or to increase the cross-linking yield.

SUMMARY OF THE INVENTION

It is an object of the invention to develop a method to produce radically cross-linked polymers rapidly and economically in the presence of oxidation inhibitors without inhibitor-related interference in the cross-linking process, and if possible increase the cross-linkage yield.

According to the invention, this is achieved by cross-linking in the presence of oxidation inhibitors, wherein the inhibition-active —OH and/or —NH groups are substituted, at least in part, by protective silyl and/or silylene groups, the inhibitor containing therein at least one silylalkenyl group.

In the method according to the invention, the inhibition-active functions of the oxidation inhibitors are substituted with protective groups, i.e., the oxidation inhibitors are "masked" or "capped." The surprising fact is that the oxidation inhibitors used in a masked form impart to the radically cross-linked polymers similar aging stability as unmasked oxidation inhibitors, or even increased the aging stability of such polymers. This is surprising because of the strong conviction expressed in the literature that oxidation inhibitors would lose their effectiveness if their active —NH or —OH groups were deactivated by reaction with organo-silanes (cf., R. V. Albarino and H. Schonhorn, J.Appl.Polym.Sci. 17 3325 (1973)).

A possible explanation for the unexpectedly high effectiveness of the oxidation inhibitors used in masked form for stabilizing radically cross-linked polymers is that their inhibitory functions survive the cross-linking process largely without damage because of the masking and thereafter the gradual hydrolysis of the Si—O or Si—N bonds by means of, for example, small amounts of diffused-in water, cause them to recover their effectiveness. It would seem that the hydrolytic reformation takes place with sufficient speed, so that sufficient amounts of free oxidation inhibitors would be available immediately after cross-linking; the high degree of effectiveness of the masked oxidation inhibitors, however, may be specific.

In the method according to the invention, at least one condensation catalyst for silanol groups can be added to the radically cross-linkable polymers. These catalysts accelerate the condensation of the silanol groups released in the hydrolysis of the Si—O and Si—N bonds into siloxane bridges.

A further advance of the method according to the invention, is that the masked oxidation inhibitors are distributed homogenously in the polymers due to their high solubility in nonpolar hydrocarbons. Secondly, they are anchored in their positions during cross-linking which probably increases their effectiveness after re-formation (see in this connection the concurrently filed U.S. patent application Ser. No. 40,471, entitled "Method For Stabilizing Polymers," now abandoned).

In the method according to the invention, higher degrees of cross-linking are surprisingly achieved than is possible if customary non-masked oxidation inhibitors are used. The increase in cross-linkage yields, which is reached by the use of compounds substituted with alkenyl groups according to this invention, is greater than in the method described in the above-mentioned, concurrently filed U.S. Patent Application, wherein masking components without alkenyl groups are used. The method described herein makes possible, a greater reduction of the concentrations of cross-linking initiators to achieve the same degree of cross-linking. Or, in the case of cross-linking by radiation, a greater reduction of the radiation dose. This considerably facilitates the manufacture or radiation-cross-linked medium-voltage cable and wire insulation. In the case of peroxide-initiated cross-linking, the peroxide concentration can be reduced or the cross-linking time can be shortened. In the case of silane cross-linking, wherein the chemical cross-linking is carried out with the aid of alkenyltrialkoxysilanes, the peroxide concentration required for grafting can be lowered, whereby the degree of high interference of cross-linking in the polymer during the grafting process can be reduced.

To explain the cross-linkage-enhancing effect of the oxidation inhibitors in the masked form, it may be assumed that the oxidation inhibitors are incorporated into the basic polymer lattice via the olefinic double bonds of the masking components during the cross-linking, so that they are anchored in the polymer lattice until they are hydrolytically re-formed. With the release of the oxidation inhibitors, lattice-bound silanols are produced and react with each other, especially in the presence of suitable catalysts such as dibutyl tin dilaurate, to form siloxane bridges, whereby the degree of cross-linking is further increased.

Since oxidation inhibitors with several —OH and/or —NH functions are oligomerized in the masking via silylene groups, it is particularly advantageous to use silylene masking components which further contain alkenyl groups. The oligomerized products, which contain several alkenyl groups, act as cross-linkage promoters since they facilitate via their C=C double bonds the development of linkage points in the polymer lattice.

A further advantage of employing oxidation inhibitors in the masked state according to the invention, is that discoloration occurring in the process is less than if unmasked products are used.

The oxidation inhibitors masked by protective silyl or silylene groups may exhibit, in particular, the following chemical structure:

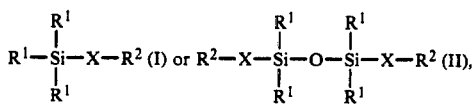

where
(1) X is an oxygen atom or an $NR^6$-group;
(2) $R^1$ is cycloalkyl, aryloxy, aralkyloxy with 7 to 11 C-atoms and cycloalkyloxy, preferably alkyl with 1 to 3 C-atoms; phenyl, alkyloxy with 1 to 3 C-atoms; methoxyethoxy or ethoxyethoxy, and at least one of the $R^1$ moiety is alkenyl with 2 or 3 C-atoms;
(3a) $R^2$ can be a moiety of the following structure

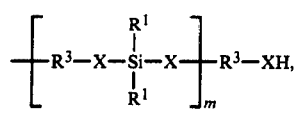

where m is a number 1 to 50, preferably 1 to 20; and $R^3$ is
(i) a divalent aromatic radical of the form

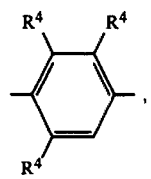

wherein $R^4$ is hydrogen, n- or iso-alkyl with 1 to 5 C-atoms or the two $R^4$ ortho substituents together can be benzo; or (ii) a divalent aromatic radical of the form

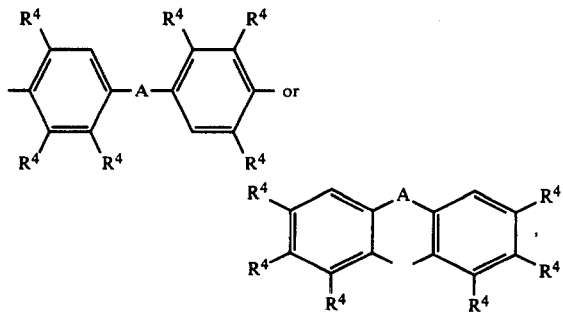

wherin $R^4$ is as described above and A is n- or isoalkylene with 1 to 5 C-atoms, O; NH; S;

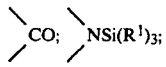

$-CH_2-O-CH_2-$;

$-CH_2-S-CH_2-$; 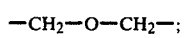 $-CH_2-O-$ 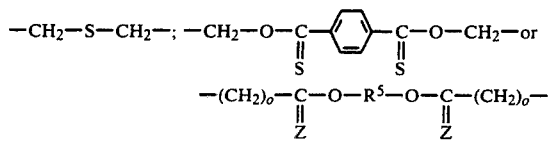 ... $-O-CH_2-$ or $-(CH_2)_o-\underset{\underset{Z}{\|}}{C}-O-R^5-O-\underset{\underset{Z}{\|}}{C}-(CH_2)_o-$ (with $R^5$=n- or iso-alkylene with 1 to 5 C-atoms, Z=O or S and o=0 to 3);

(3b) $R^2$ and/or $R^6$ can be a radical of the following structure

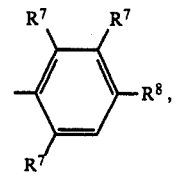

wherein $R^7$ is hydrogen, n- and isoalkyl with 1 to 5 C-atoms or the two $R^7$ ortho substituents together can be benzo or naphtho and $R^8$ is (i) hydrogen, n- or isoalkyl with 1 to 5 C-atoms, $-O-Si(R^1)_3$ or $-NR^9-Si(R^1)_3$ (with $R^9$=n- or isoalkyl with 1 to 5 C-atoms, aryl or aralkyl with 7 to 11 C-atoms);

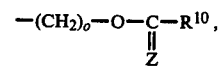

where Z=O or S, o=0 to 3 and $R^{10}$=n- or isoalkyl with 1 to 18 C-atoms;

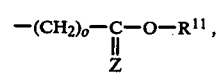

where Z=O or S, o=0 to 3 and $R^{11}$=n- or isoalkyl with 1 to 18 C-atoms, aryl or

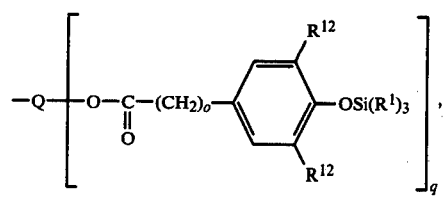

where o=0 to 3, $R^{12}$=n— or iso-alkyl with 1 to 5 C-atoms and Q is a (q+1)— times substituted n- or isoalkyl radical with 1 to 6 C-atoms (q=1 to 5) or cycloalkyl(q=1 or 2), aryl- (q=1 or 2) or triazine radical (q=1 or 2);

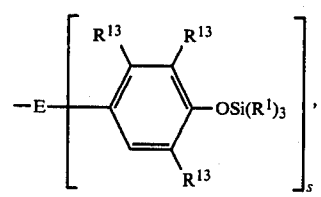

where substituent $R^{13}$ is hydrogen or n- and iso-alkyl with 1 to 5 C-atoms; E is an (s+1)- times substituted n- or isoalkyl radical with 1 to 6 C-atoms (s=1 to 5) or aryl (s=1 or 2) or triazine radical (s=1 or 2) or S (s=1), 0 (s=1), $NSi(R^1)_3$ (s=1) and >CO (s=1);

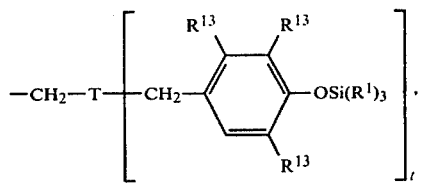

wherein $R^{13}$ is as defined hereinabove and T is N (with t=2), S (with t=1), O (with t=1),

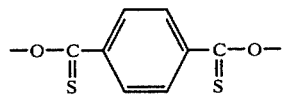

with
(t=1) and

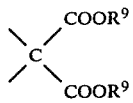

(with t=1 and $R^9$ is as defined hereinabove).

(3c) $R^2$ and $R^6$, with $X=NR^6$, together with N, are a component of an at least partially saturated heterocyclic, optionally oligomerized system with a base consisting of the following classes of compounds:

Oxazol, thiazol, diazol, oxadiazol, triazol, oxazine, thiazine, diazine, triazine, indol and quinoline.

In the method according to the invention, oxidation inhibitors with the following structure are preferably used:

(a) 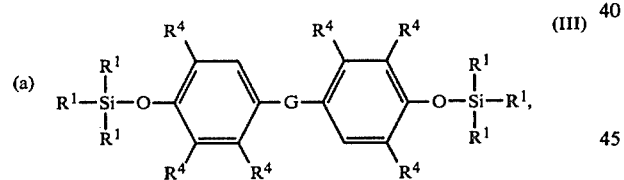

wherein G is n- or iso-alkylene with 1 to 5 C-atoms, O or S, and $R^1$ is cycloalkyl; aryloxy; aralkyloxy with 7 to 11 C-atoms; cycloalkyloxy; preferably alkyl with 1 to 3 C-atoms; phenyl; alkyloxy with 1 to 3 C-atoms; methoxyethoxy and ethoxyethoxy and wherein at least one $R^1$ at each Si-atom is alkylene with 2 to 3 C-atoms; and $R^4$ is hydrogen or n- and isoalkyl with 1 to 5 C-atoms; or the two $R^4$ ortho substituents together can be benzo;

(b) 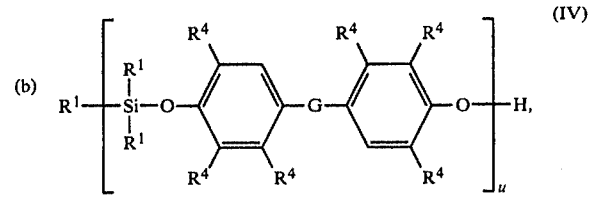

wherein u is a number from 1 to 20 and $R^1$, $R^4$ and G are defined as above;

(c) 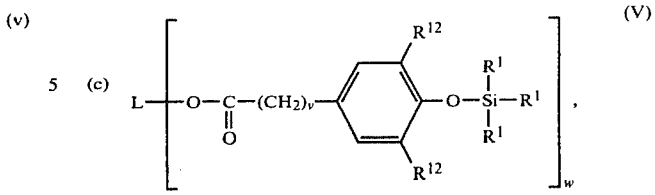

wherein v=0 to 2 and w=1 to 6, $R^1$ is defined as above, $R^{12}$ is n- or isoalkyl with 1 to 5 C-atoms and L is a w-times substituted n- or isoalkyl radical with 1 to 6 C-atoms;

(d) 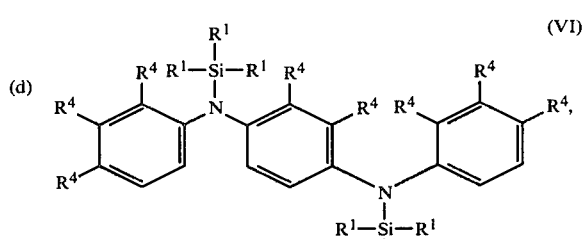

wherein $R^1$ and $R^4$ are defined as above (e) 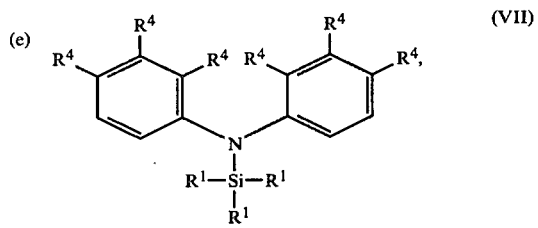

wherein $R^1$ and $R^4$ are defined as above;

(f) 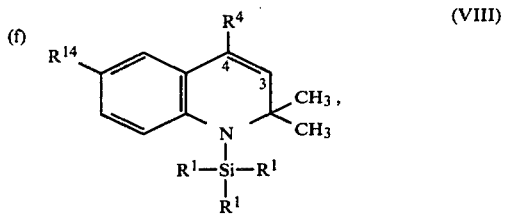

wherein $R^1$ and $R^4$ are defined as above and $R^{14}$ is hydrogen, n- or isoalkyl with 1 to 12 C-atoms and n- or isoalkyloxy with 1 to 12 C-atoms:

(g) compounds which are formed by oligomerizing compounds of the structure VIII via the C=C double bond at the atoms $C^3$ and $C^4$.

As examples for oxidation inhibitors which can be employed in the masked condition according to the invention, the following typical compounds are mentioned:

2,6-dialkyl-phenols, 2,4-dialkyl-phenols, 2,4,6-trialkyl phenols, alkylized hydroquinones, hydroxylated thiodiphenyl ethers, alkylidene bisphenols, hydroxydibenzyl ethers and thioethers, hydroxydibenzylamines, hydroxybenzylated malonic esters, hydroxybenzylated benzene, S-triazine radical-containing phenolic or aminic oxidation inhibitors, amides of β-(3,5-di-t-butyl-4-hydroxy-phenyl)-propionic acid, esters of β-(3,5-di-t- butyl-4-hydroxyl-phenyl) propionic acid with uni or multi-valent alcohols or glycols, esters of β-(4-hydroxy-3-methyl-5-t-butyl-phenyl)-propionic acid with alcohols or glycols, esters of 3,5-di-t-butyl-4-hydroxy-phenyl acetic acid with alcohols or glycols, as well as N-, O- and S-heterocycles, aminoaryl derivatives such as phenyl-2-naphthylamine, The masking of the phenolic and aminic oxidation inhibitors is carried out through reaction with silane derivatives of the formula $M_{4-x}Si(R^1)_x$, wherein M is a group capable of O- or N-silylization, for example, halogen, alkoxy, alkenoxy and silyl amino; x can assume values from 1 to 3; and at least one $R^1$ contains an olefinic double bond. Preferred over all others is silylization with silane derivatives, in which M is chlorine; such compounds are, for example, chlorodimethylvinyl silane, dichloromethylvinyl silane and 1,3-dichloro-1,3-divinyl-dimethyl disiloxane. Silylizing with organochlorosilanes is carried out in customery inert solvents such as toluene and diethyl ether, optionally with the addition of at least one equivalent of a tertiary amine. The preparation of the masked oxidation inhibitors which are used in the method according to the invention, is described in the concurrently-filed U.S. patent application Ser. No. 40,470 entitled "New Silyl Compounds" now abandoned.

Examples for oxidation inhibitors masked according to the invention are:

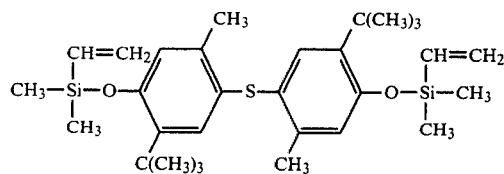

bis(4-dimethylvinylsilyloxy-2-methyl-5-t-butyl)-diphenyl thioether;

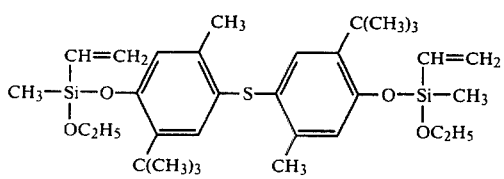

bis(4-ethoxymethylvinylsilyloxy-2-methyl-5-t-butyl)-diphenyl thioether;

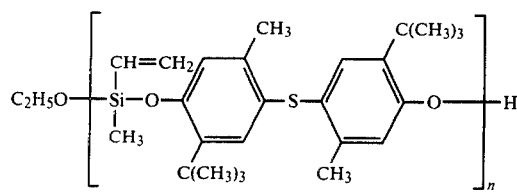

bis(4-hydroxy-2-methyl-5-t-butyl)diphenyl thioether oligomerized via methylvinylsilylene groups;

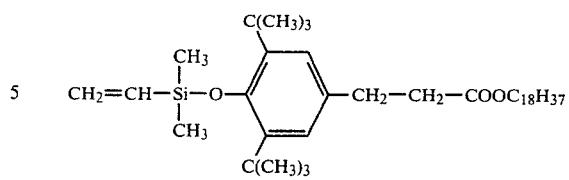

β-(4-dimethylvinylsilyloxy-3,5-di-t-butyl-phenyl)propionic acid octadecyl ester;

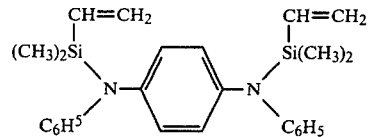

N,N'-bis(dimethylvinylsilyl)-N,N'-diphenyl-p-phenylene diamine.

The silylized phenols, amines and heterocyclic compounds which correspond to Formula I and II and prepared in the manner described, are easily hydrolyzed and must therefore be protected against moisture. However, this requires no special measures.

By the method according to the invention, radically cross-linked polymers, e.g., cross-linked polyolefins, can be protected from damage by oxidation. In detail, it is possible to stabilize by the method according to the invention especially cross-linked homo- and co-polymerizates of ethylene and α-olefins such as propene and 1-butene, as well as co-polymerizates of ethylene and α-olefins such as propene and 1-butene, as well as co-polymerizates of ethylene and α-olefins such as vinyl acetate and ethyl acrylate, and cross-linked ter-polymerizates of ethylene, propene and a diene such as hexadiene, dicyclopentadiene or ethylidene norbornenes, polymer mixtures with a polyolefin base or with polyolefins as the essential component and block copolymers with a base of polyolefins or with polyolefins as the essential component.

The oxidation inhibitors masked according to the invention exhibit good compatibility with the cross-linked polymers and discoloration occurs only slightly if at all. They are worked into the polymers prior to cross-linking in concentrations of 0.01 to 10.0 weight % and preferably 0.1 to 5.0 weight % by the customary methods, for example, in an internal mixer. The polymer mixtures so obtained are radically cross-linked after forming, e.g., as foils, molded parts, hoses, tubings, injection-molded articles and coated wires, cables and lines, by organic peroxides or high-energy radiation.

For peroxide cross-linking, the customery organic peroxides for cross-linking olefin polymers can be used, preferably dicumyl peroxide and di-t-butyl-substituted peroxides such as di-t-butyl-peroxide, 1,3-bis(t-butyl-peroxyisopropyl)-benzene and 2,5-di-t-butylperoxy-2,5-dimethylhexane. Cross-linking with high-energy radiation can be accomplished preferably by β-rays but also by gamma or X-rays. Sources of radiation used herein are X-ray equipment or radioactive isotopes and, preferably electron accelerators. Suitable condensation catalysts for silanol groups are the amine or carbonic-acid salts of many metals such as Pb, Zn, Zr, Sb, Fe, Cd, Sn, Ba, Ca, and Mn, especially naphthenates, octoates, hexoates, laurates and acetates. Tin (II) octoate and dibutyl tin dilaurate, in particular, have been proven as useful.

The cross-linked polymers stabilized by means of the method according to the invention may, of course, also contain still other additives which are used in polymer formulations such as metal deactivators, peroxide decomposers, UV absorbents, cross-linkage-accelerating additives, softeners, antistatic agents, flame-protection agents, pigments, carbon black and glass fibers, as well as mineral fillers such as kaolin, chalk and talc.

EXAMPLES

The invention will be explained further with the aid of the following examples.

The stabilizing effect of the oxidation inhibitors against thermal oxidative decomposition according to the invention is demonstrated in the examples by measuring the volume of oxygen absorbed by the polymer films as a function of time at a temperature of 135° C. and a pressure of 1 bar. It corresponds to the volume loss in a closed system filled with pure oxygen which contains the sample of the peroxide- or radiation-cross-linked polymer in the form of a pressed foil 100 μm thick. The system further contains barium oxide as an absorbent for the gaseous acid reaction products and for water. The induction period is chosen in the following embodiments to compare the stabilizing effect of the oxidation inhibitors of the invention. This is the time for spontaneous incipient autoxidation, i.e., the initiation of exponential increase in oxygen absorption of the test body. The initiation of autoxidation can be determined very simply from the graph of oxygen absorption (in ml per g of foil) versus time (in hours) by linear extrapolation of the exponential curve indicating autoxidation to intersect with the time axis.

The percent cross-linkage of the cross-linked polymer mixtures is determined on 1-mm sheets by determining the insoluble gel-content after granulate extraction for 12 hours (granulate of cubes of 1 mm side length) in boiling xylol.

EXAMPLE 1

Example 1 shows that, when using the oxidation inhibitors masked according to the invention for stabilizing cross-linked polyethylene, better cross-linking is obtained than with unmasked oxidation inhibitors or with comparably masked oxidation inhibitors wherein the masking components contain no alkylene groups.

(a) Radiation Cross-Linking

High-pressure polyethylene LDPE (d=0.918, $MFI_{190/2}=0.2$) is plasticized at 135° C. in a laboratory kneader. After the oxidation inhibitor is added under nitrogen, it is homogenized for 3 minutes and the mixture is then granulated. From the granulate, 1-mm sheets are pressed at 180° C., and cross-linked in a 750 kV cascade electron accelerator with a dose of 200 kGy. The mixture ratios and the cross-linking results (gel value) are summarized in Table 1.

TABLE I

| | LDPE [g] | Oxidation-inhibitor [g] | Gel Value [% Gel fraction] |
|---|---|---|---|
| Bis(4-hydroxy-2-methyl-5-t-butyl)diphenylthioether | 99.60 | 0.40 | 55 |
| Bis(2-methyl-5-t-butyl-4-trimethylsilyloxy)-diphenylthioether | 99.44 | 0.56 | 55 |
| Bis(4-dimethylvinylsilyloxy-2-methyl-5-t-butyl-diphenylthioether | 99.36 | 0.64 | 66 |
| Bis(4-hydroxy-2-methyl-5-t-butyl)diphenylthioether oligomerized via dimethylsilylene groups | 99.53 | 0.47 | 65 |
| Bis(4-hydroxy-2-methyl-5-t-butyl)diphenylthioether oligomerized via methylvinylsilylene groups | 99.52 | 0.48 | 69 |

(b) Peroxide Cross-Linking

High-pressure polyethylene LDPE (d=0.918 $MFI_{190/2}=0.2$) is plasticized at 135° C. in a laboratory kneader. After the oxidation inhibitor is added, it is homogenized for 2 minutes; subsequently, the cross-linking initiator 1,3-bis(t-butyl-peroxyisopropyl)benzene is added and the homogenization is continued for another 2 minutes. The mixture is then granulated and from the granulate, 1-mm sheets and 100-μm foils are pressed and cross-linked at 180° C. for 15 minutes. The composition of the mixture and the cross-linkage results are given in Table 2.

TABLE II

| | LDPE [g] | Cross-Linking initiator [g] | Oxidation-inhibitor [g] | Gel Value [% Gel fraction] |
|---|---|---|---|---|
| Bis(4-hydroxy-2-methyl-5-t-butyl)diphenylthioether | 98.40 | 1.20 | 0.40 | 77.5 |
| | 98.90 | 0.70 | 0.40 | 60.5 |
| | 99.10 | 0.50 | 0.40 | 49.0 |
| Bis(2-methyl-5-t-butyl-4-trimethylsilyloxy)-diphenylthioether | 98.24 | 1.20 | 0.56 | 83.5 |
| | 98.94 | 0.50 | 0.56 | 68.5 |
| Bis(4-dimethylvinylsilyloxy-2-methyl-5-t-butyl)diphenylthioether | 98.16 | 1.20 | 0.64 | 89.0 |
| | 98.86 | 0.50 | 0.64 | 79.0 |
| Bis(4-hydroxy-2-methyl-5-t-butyl)diphenylthioether oligomerized via dimethylsilylene groups | 98.33 | 1.20 | 0.47 | 84.0 |
| | 99.03 | 0.50 | 0.47 | 63.0 |
| Bis(4-hydroxy-2-methyl-5-t-butyl)diphenylthioether oligomerized via methylvinylsilylene groups | 98.32 | 1.20 | 0.48 | 88.0 |
| | 98.82 | 0.70 | 0.48 | 82.0 |
| | 99.02 | 0.50 | 0.48 | 76.0 |

EXAMPLE 2

Example 2 shows the results obtained if polyethylene samples stabilizid with oxidation inhibitors according to the invention are aged. Comparison is made with the results obtained with the corresponding unmasked oxidation inhibitor.

(a) Peroxide-Cross-Linked Samples

High-pressure polyethylene LDPE (d=0.918, $MFI_{190/2}=0.2$) is plasticized at 135° C. in a laboratory kneader. After the oxidation inhibitor is added, it is homogenized for 2 minutes; subsequently, the cross-linking initiator 1,3-(bis-(t-butyl-peroxyisopropyl)benzene is added and homogenization is continued for another 2 minutes. The mixture is then granulated and from the granulate, 100-μm foils are pressed which are cross-linked in the press at 180° C. for 15 minutes.

The samples are aged in pure oxygen at 135° C. and the induction period (start of the autoxidative decomposition) is determined. In Table 3, the mixing ratios and the results of the aging are summarized.

TABLE III

| | LDPE [g] | Cross-Linking initiator [g] | Oxidation-inhibitor [g] | Induction Period [h] |
|---|---|---|---|---|
| Bis(4-hydroxy-2-methyl-5-t-butyl)diphenylthioether | 98.40 | 1.20 | 0.40 | 650 |
| Bis(4-dimethylvinyl-silyloxy-2-methyl-5-t-butyl)diphenylthioether | 98.21 | 1.20 | 0.59 | 620 |
| Bis(4-hydroxy-2-methyl-5-t-butyl)diphenylthioether oligomerized via methylvinylsilylene groups | 98.32 | 1.20 | 0.48 | 650 |

(b) Radiation-Cross-Linked Samples

The mixture is prepared as in (a) but without the addition of peroxide. The 100-μm foils pressed at 180° C. are cross-linked by high energy electrons with a dose of 200 kGy. In a pure oxygen atmosphere, the induction periods are then determined by means of foil samples at an aging temperature of 135° C. They are given, together with the mixing ratios, in Table 4.

TABLE IV

| | LDPE [g] | Oxidation-inhibitor [g] | Induction-Period [h] |
|---|---|---|---|
| Bis(4-hydroxy-2-methyl-5-t-butyl-diphenylthioether | 99.60 | 0.40 | 450 |
| | 99.40 | 0.60 | 720 |
| Bis(4-dimethylvinyl-silyloxy-2-methyl-5-t-butyl)diphenyl-thioether | 99.41 | 0.59 | 420 |
| Bis(4-hydroxy-2-methyl-5-t-butyl)diphenylthioether oligomerized via methyl-vinylsilylene groups | 99.52 | 0.48 | 470 |
| | 99.28 | 0.72 | 800 |

EXAMPLE 3

Example 3 shows the influence on the degree of cross-linking of storing peroxide-cross-linked polyethylene samples stabilized according to the invention for 16 hours in boiling water. No decrease of the gel values is observed either in the presence or absence of the condensation catalyst, dibutyl tin dilaurate. These findings support the assumption that the lattice-bound silanols which are produced by hydrolysis of the Si-O or Si-N bonds, react with each other, forming siloxane bridges.

High-pressure polyethylene LDPE (d=0.918, $MFI_{190/2}=0.2$) is plasticized at 135° C. in a laboratory kneader. After the oxidation inhibitor or the mixture of oxidation inhibitor and condensation catalyst is added, it is homogenized for 2 minutes; subsequently, the cross-linking initiator 1,3-bis-(t-butyl-peroxyisopropyl)benzene is added and the homogenization is continued for another 2 minutes. The mixture is then granulated and from the granulate, 1-mm sheets and 100-μm foils are pressed and cross-linked at 180° C. for 15 minutes. The mixture composition and the results of cross-linking, i.e., the gel values immediately after the cross-linking as well as the gel values after a 16-hour storage in boiling water are summarized in Table 5.

TABLE V

| | LDPE [g] | Cross-Linking initiator [g] | Condensation Catalyst [g] | Oxidation inhibitor [g] | Gel Value [% Gel fraction] | Gel Value after 16-hour storage in water [% Gel fraction] |
|---|---|---|---|---|---|---|
| Bis(4-dimethyl-vinylsilyloxy-2-methyl-5-t-butyl)-diphenylthioether | 98.86 | 0.50 | — | 0.64 | 79.0 | 79.5 |
| | 98.56 | 0.50 | 0.30 | 0.64 | 80.5 | 81.0 |
| Bis(4-hydroxy-2-methyl-5-t-butyl)-diphenylthioether | 99.02 | 0.50 | — | 0.48 | 76.0 | 75.5 |
| | 98.72 | 0.50 | 0.30 | 0.48 | 76.0 | 75.5 |
| oligomerized via methylvinyl silylene groups | 98.82 | 0.70 | — | 0.48 | 82.5 | 82.0 |
| | 98.52 | 0.70 | 0.30 | 0.48 | 81.5 | 81.5 |

What is claimed is:

1. In a method for cross-linking radically cross-linkable saturated hydrocarbon polymer systems and for stabilizing such polymer systems against oxidative and/or thermal decomposition, the improvement comprising carrying out the cross-linking of the polymer systems in the presence of oxidation inhibitors selected from the group consisting of compounds represented by the following formulae:

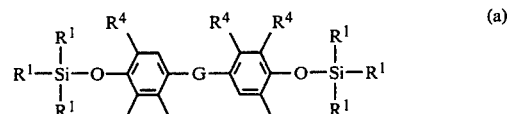

(a)

wherein G is selected from n-alkylene or iso-alkylene having 1 to 5 C-atoms, O and S;

at least one $R^1$ at each Si-atom is alkenyl with 2 to 3 C-atoms and, for any remaining positions, $R^1$ is selected from cycloalkyl, aryloxy, aralkyloxy having 7 to 11 C-atoms, cycloalkyloxy, alkyl with 1 to 3 C-atoms, phenyl, alkyloxy with 1 to 3 C-atoms, methoxyethoxy and ethoxyethoxy; and $R^4$ is selected from hydrogen, n- or iso-alkyl with 1 to 5 C-atoms or the two $R^4$ ortho substituents together can be benzo;

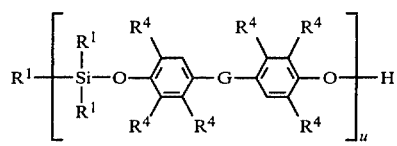

(b)

wherein u is a number from 1 to 20 and $R^1$, $R^4$ and G are as defined above;

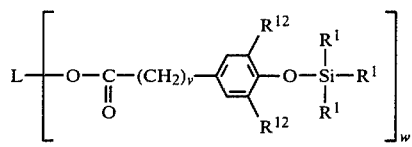

(c)

wherein v=0 to 2 and w=1 to 6, $R^1$ is as defined above, $R^{12}$ is n- or iso-alkyl with 1 to 5 C-atoms and L is a w-times substituted n- or isoalkyl radical with 1 to 6 C-atoms;

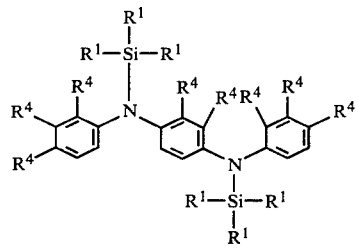

(d)

wherein $R^1$ and $R^4$ are as defined above;

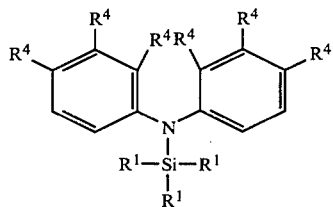

(e)

wherein $R^1$ and $R^4$ are as defined above;

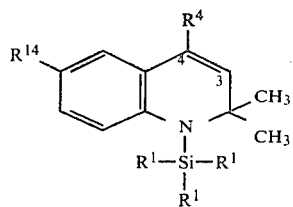

(f)

wherein $R^1$ and $R^4$ are as defined above; $R^{14}$ is selected from hydrogen, n- or isoalkyl with 1 to 12 C-atoms and n- or isoalkyloxy with 1 to 12 C-atoms;

(g) compounds formed by oligimerizing the compounds of (f) via the C=C double bond at atoms $C^3$ and $C^4$ and

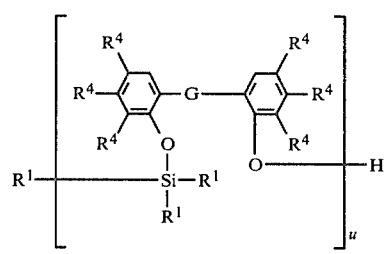

(h)

wherein $R^1$, $R^4$, G and u are as defined above.

2. The method according to claim 1, wherein at least one condensation catalyst for silanol groups is added to the radically cross-linkable polymers.

3. The method according to claim 1 or 2, wherein the amount of said oxidation inhibitor utilized is from about 0.01 to 10.0 weight %, referred to the polymer.

4. The method of claim 3 whereein the amount of said oxidation inhibitor is from about 0.1 to 5.0 weight %, referred to the polymer.

5. The method according to claim 1, wherein the radically cross-linkable polymers are selected from the group consisting of homo- or copolymerizates of ethylene and α-olefins, copolymerizates of ethylene with vinyl acetate or ethylacrylate, terpolymerizates obtained by polymerization of ethylene with propene in the presence of non-conjugated dienes, mixtures of such polymers with a base of polyolefins or with polyolefins as the essential component, and block copolymers with a base of polyolefins or with polyolefins as the essential component.

* * * * *